(12) United States Patent
Kwon et al.

(10) Patent No.: US 10,428,908 B2
(45) Date of Patent: Oct. 1, 2019

(54) MULTI-STAGE TRANSMISSION FOR VEHICLES

(71) Applicants: HYUNDAI MOTOR COMPANY, Seoul (KR); KIA MOTORS CORPORATION, Seoul (KR)

(72) Inventors: Hyun Sik Kwon, Seoul (KR); Seong Wook Ji, Gunpo-si (KR); Ju Hyeon Park, Suwon-si (KR); Il Han Yoo, Hwasun-gun (KR); Seong Wook Hwang, Gunpo-si (KR); Ki Tae Kim, Incheon (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 15/832,420

(22) Filed: Dec. 5, 2017

(65) Prior Publication Data

US 2019/0085951 A1 Mar. 21, 2019

(30) Foreign Application Priority Data

Sep. 19, 2017 (KR) .................. 10-2017-0120382

(51) Int. Cl.
*F16H 3/66* (2006.01)
*F16H 3/44* (2006.01)

(52) U.S. Cl.
CPC ......... *F16H 3/66* (2013.01); *F16H 2003/445* (2013.01); *F16H 2200/0069* (2013.01); *F16H 2200/2012* (2013.01); *F16H 2200/2046* (2013.01)

(58) Field of Classification Search
CPC .............. F16H 3/66; F16H 2200/0069; F16H 2200/2012; F16H 2200/2046
See application file for complete search history.

(56) References Cited

U.S. PATENT DOCUMENTS

| 2015/0119188 A1* | 4/2015 | Beck | F16H 3/66 475/276 |
| 2016/0053869 A1* | 2/2016 | Beck | F16H 3/66 475/275 |
| 2016/0169343 A1* | 6/2016 | Cho | F16H 3/66 475/275 |
| 2016/0356363 A1* | 12/2016 | Ji | F16H 3/66 |

FOREIGN PATENT DOCUMENTS

KR 20130003981 1/2013

* cited by examiner

*Primary Examiner* — Huan Le
(74) *Attorney, Agent, or Firm* — Lempia Summerfield Katz LLC

(57) ABSTRACT

A multi-stage transmission for vehicles includes an input shaft and an output shaft, a first planetary gear set, a second planetary gear set, a third planetary gear set, and a fourth planetary gear set configured to transmit rotary force between the input shaft and the output shaft. Each of the planetary gear sets has three rotary elements. Six gear shift elements are connected to the rotary elements of the planetary gear sets.

9 Claims, 2 Drawing Sheets

FIG. 2

| GEAR STAGE | CL1 | CL2 | CL3 | CL4 | B1 | B2 | GEAR RATIO |
|---|---|---|---|---|---|---|---|
| 1 |  | ● | ● |  | ● |  | 4.410 |
| 2 |  | ● |  |  | ● | ● | 3.120 |
| 3 |  | ● | ● |  |  | ● | 2.305 |
| 4 |  | ● |  | ● |  | ● | 1.591 |
| 5 | ● | ● |  |  |  | ● | 1.345 |
| 6 | ● |  |  | ● |  | ● | 1.234 |
| 7 | ● |  | ● | ● |  |  | 1.000 |
| 8 | ● |  | ● |  |  | ● | 0.911 |
| 9 | ● |  | ● |  | ● |  | 0.768 |
| 10 | ● |  |  |  | ● | ● | 0.543 |
| REV. |  | ● |  | ● | ● |  | −2.736 |

MULTI-STAGE TRANSMISSION FOR VEHICLES

CROSS-REFERENCE TO RELATED APPLICATION

This application claims the priority benefit of Korean Patent Application No. 10-2017-0120382, filed on Sep. 19, 2017, in the Korean Intellectual Property Office, the disclosure of which is incorporated herein by reference.

BACKGROUND

1. Field of the Disclosure

The present disclosure relates to a multi-stage transmission for vehicles. More particularly, the disclosure relates to a multi-stage transmission for vehicles configured such that the maximum possible number of gear shift stages is realized through a relatively small number of parts and a simple structure, whereby the fuel economy of vehicles is improved.

2. Description of the Related Art

The recent increase in oil prices has forced vehicle manufacturers all around the world to improve the fuel economy of vehicles. Extensive effort has been made to reduce the weight of engines through various technologies, such as downsizing, to improve the fuel economy of vehicles.

One of the fuel economy improvement methods that are applicable to a transmission provided in a vehicle is increasing the number of gear shift stages of the transmission such that the engine can be operated at a more efficient operation point.

In the method in which the number of gear shift stages of the transmission is increased, the engine can be driven within a relatively low revolutions per minute (RPM) range, whereby the noise of the vehicle may be further attenuated.

As the number of gear shift stages of the transmission is increased, the number of parts constituting the transmission is also increased. The increased number of parts results in lowering the ease of fitting the transmission in the vehicle, increasing the costs and weight of the transmission, and reducing the transfer efficiency of the transmission. For these reasons, it is important to provide a transmission that exhibits maximum efficiency while having a small number of parts and a relatively simple structure in order to maximize the effect of improving fuel efficiency through the increase in the number of gear shift stages of the transmission.

The matters disclosed in this section are merely for enhancement of understanding of the general background of the disclosure and should not be taken as an acknowledgment or any form of suggestion that the matters form the related art already known to a person having ordinary skill in the art.

SUMMARY

Therefore, the present disclosure has been made in view of the above problems. An object of the present disclosure is to provide a multi-stage transmission for vehicles configured such that the maximum possible number of gear shift stages is realized through a relatively small number of parts and a simple structure, whereby the fuel economy of vehicles is improved.

In accordance with an aspect of the present disclosure, the above and other objects can be accomplished by the provision of a multi-stage transmission for vehicles that includes an input shaft, an output shaft, a first planetary gear set, a second planetary gear set, a third planetary gear set, and a fourth planetary gear set configured to transmit rotary force between the input shaft and the output shaft. Each of the planetary gear sets has three rotary elements and six gear shift elements connected to at least one of the three rotary elements of the first to fourth planetary gear sets. A first rotary element of the first planetary gear set is fixedly connected to a first rotary element of the second planetary gear set and to a first rotary element of the third planetary gear set. A second rotary element of the first planetary gear set is fixedly connected to a third rotary element of the third planetary gear set. A third rotary element of the first planetary gear set is fixedly connected to a second rotary element of the second planetary gear set. The second rotary element of the second planetary gear set is fixedly connected to a third rotary element of the fourth planetary gear set. A second rotary element of the third planetary gear set is selectively connected to a transmission case via one of the gear shift elements. A first rotary element of the fourth planetary gear set is selectively connected to the transmission case via another one of the gear shift elements. A second rotary element of the fourth planetary gear set is fixedly connected to the output shaft.

The second rotary element of the first planetary gear set may be selectively connected to the input shaft. A third rotary element of the second planetary gear set may be selectively connected to the input shaft. The first rotary element of the third planetary gear set may be selectively connected to the first rotary element of the fourth planetary gear set and to the second rotary element of the fourth planetary gear set.

The second rotary element of the third planetary gear set may be selectively connected to the transmission case via a first brake, which is one of the gear shift elements. The first rotary element of the fourth planetary gear set may be selectively connected to the transmission case via a second brake, which is another one of the gear shift elements. The remaining gear shift elements may be configured to form variable connection structures between the rotary elements of the planetary gear sets.

A first clutch, which is one of the gear shift elements, may form a variable connection structure between the second rotary element of the first planetary gear set and the input shaft. A second clutch, which is another one of the gear shift elements, may form a variable connection structure between the third rotary element of the second planetary gear set and the input shaft. A third clutch, which is another one of the gear shift elements, may form a variable connection structure between the first rotary element of the third planetary gear set and the first rotary element of the fourth planetary gear set. A fourth clutch, which is another one of the gear shift elements, may form a variable connection structure between the first rotary element of the third planetary gear set and the second rotary element of the fourth planetary gear set.

The first, second, and third rotary elements of the first planetary gear set may include a first sun gear, a first carrier, and a first ring gear. The first, second, and third rotary elements of the second planetary gear set may include a second sun gear, a second carrier, and a second ring gear.

The first, second, and third rotary elements of the third planetary gear set may include a third sun gear, a third carrier, and a third ring gear. The first, second, and third rotary elements of the fourth planetary gear set may include a fourth sun gear, a fourth carrier, and a fourth ring gear.

In accordance with another aspect of the present disclosure, there is provided a multi-stage transmission for vehicles. The multi-stage transmission includes a first planetary gear set, a second planetary gear set, a third planetary gear set, and a fourth planetary gear set, each of which has three rotary elements. First to eighth rotary shafts are connected to at least one of the three rotary elements of the first to fourth planetary gear sets. The first rotary shaft is an input shaft. The second rotary shaft is directly connected to a first rotary element of the first planetary gear set, to a first rotary element of the second planetary gear set, and to a first rotary element of the third planetary gear set. The third rotary shaft is directly connected to a second rotary element of the first planetary gear set and to a third rotary element of the third planetary gear set. The fourth rotary shaft is directly connected to a third rotary element of the first planetary gear set, to a second rotary element of the second planetary gear set, and to a third rotary element of the fourth planetary gear set. The fifth rotary shaft is directly connected to a third rotary element of the second planetary gear set. The sixth rotary shaft is directly connected to a second rotary element of the third planetary gear set. The seventh rotary shaft is directly connected to a first rotary element of the fourth planetary gear set. The eighth rotary shaft is an output shaft, which is directly connected to a second rotary element of the fourth planetary gear set.

The multi-stage transmission may further include four clutches that each interconnect corresponding rotary shafts of the first to eighth rotary shafts in respective pairs and two brakes that each selectively connect a respective one of the rotary shafts to one of the input shaft or the output shaft that is not connected to a transmission case.

The four clutches may include a first clutch mounted between the first rotary shaft and the third rotary shaft, a second clutch mounted between the first rotary shaft and the fifth rotary shaft, a third clutch mounted between the second rotary shaft and the seventh rotary shaft, and a fourth clutch mounted between the second rotary shaft and the eighth rotary shaft. The two brakes may include a first brake mounted between the sixth rotary shaft and the transmission case and a second brake mounted between the seventh rotary shaft and the transmission case.

The first, second, and third rotary elements of the first planetary gear set may include a first sun gear, a first carrier, and a first ring gear. The first, second, and third rotary elements of the second planetary gear set may include a second sun gear, a second carrier, and a second ring gear. The first, second, and third rotary elements of the third planetary gear set may include a third sun gear, a third carrier, and a third ring gear. The first, second, and third rotary elements of the fourth planetary gear set may include a fourth sun gear, a fourth carrier, and a fourth ring gear.

BRIEF DESCRIPTION OF THE DRAWINGS

The above and other objects, features, and other advantages of the present disclosure will be more clearly understood from the following detailed description taken in conjunction with the accompanying drawings, in which:

FIG. 2 is a table showing operation modes of the multi-stage transmission for vehicles according to the embodiment of the present disclosure.

DETAILED DESCRIPTION

Figure 1:
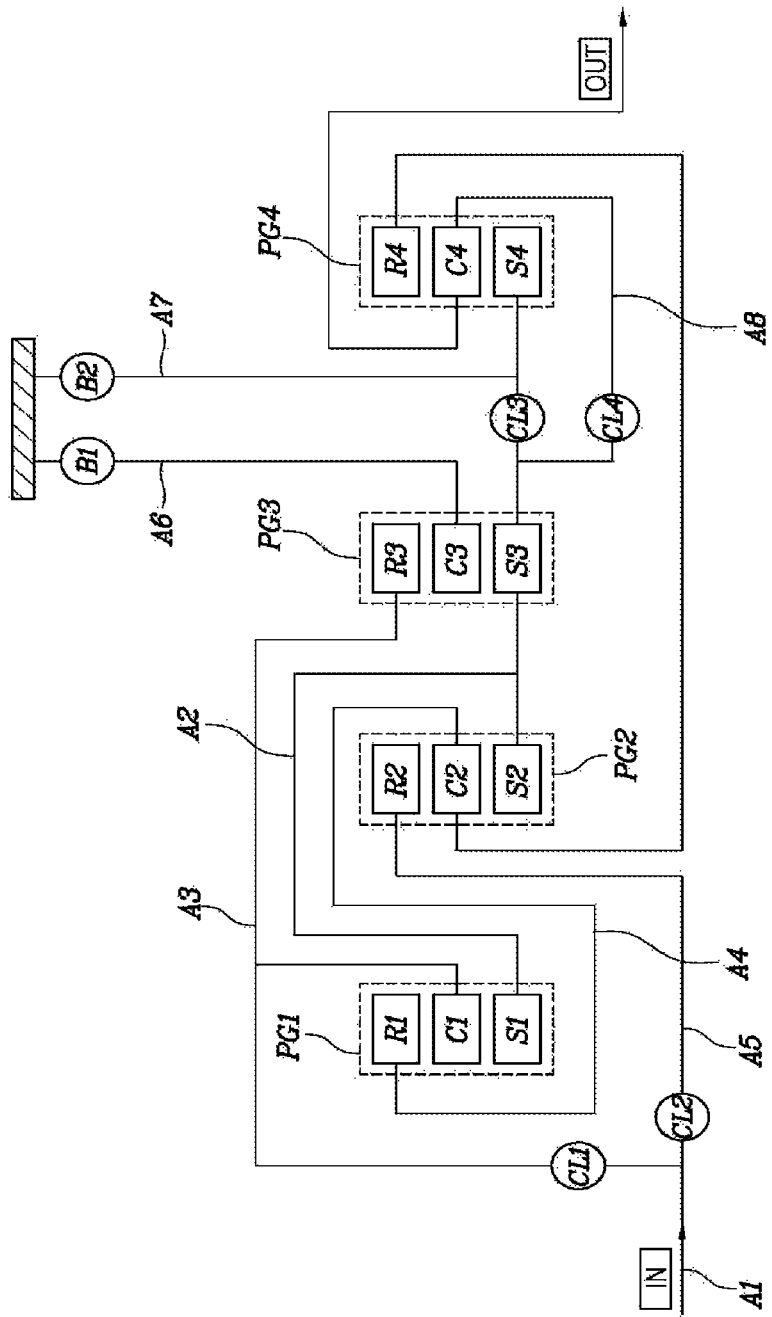
FIG. 1 is a view schematically showing the structure of a multi-stage transmission for vehicles according to an embodiment of the present disclosure.

Hereinafter, embodiments of a multi-stage transmission for vehicles according to the present disclosure will be described with reference to the accompanying drawings.

FIG. 1 is a view schematically showing the structure of a multi-stage transmission for vehicles according to an embodiment of the present disclosure. FIG. 2 is a table showing operation modes of the multi-stage transmission for vehicles according to the embodiment of the present disclosure.

Referring first to FIG. 1, the multi-stage transmission for vehicles according to the present disclosure includes an input shaft IN, an output shaft OUT, a first planetary gear set PG1, a second planetary gear set PG2, a third planetary gear set PG3, and a fourth planetary gear set PG4 configured to transmit rotary force between the input shaft IN and the output shaft OUT. Each of the planetary gear sets has three rotary elements. Six gear shift elements are connected to the rotary elements of the planetary gear sets.

A first rotary element S1 of the first planetary gear set PG1 is fixedly connected to a first rotary element S2 of the second planetary gear set PG2 and to a first rotary element S3 of the third planetary gear set PG3. A second rotary element C1 of the first planetary gear set PG1 is fixedly connected to a third rotary element R3 of the third planetary gear set PG3. A third rotary element R1 of the first planetary gear set PG1 is fixedly connected to a second rotary element C2 of the second planetary gear set PG2.

The second rotary element C2 of the second planetary gear set PG2 is fixedly connected to a third rotary element R4 of the fourth planetary gear set PG4.

A second rotary element C3 of the third planetary gear set PG3 is selectively connected to a transmission case CS via one of the gear shift elements.

A first rotary element S4 of the fourth planetary gear set PG4 is selectively connected to the transmission case CS via another one of the gear shift elements. A second rotary element C4 of the fourth planetary gear set PG4 is fixedly connected to the output shaft OUT.

The first planetary gear set PG1, the second planetary gear set PG2, the third planetary gear set PG3, and the fourth planetary gear set PG4 may be sequentially arranged in the axial direction from the input shaft IN to the output shaft OUT.

Meanwhile, the second rotary element C1 of the first planetary gear set PG1 is selectively connected to the input shaft IN. A third rotary element R2 of the second planetary gear set PG2 is selectively connected to the input shaft IN. The first rotary element S3 of the third planetary gear set PG3 is selectively connected to the first rotary element S4 of the fourth planetary gear set PG4 and to the second rotary element C4 of the fourth planetary gear set PG4.

In the present disclosure, the second rotary element C3 of the third planetary gear set PG3 is selectively connected to the transmission case CS via a first brake B1, which is one of the gear shift elements. The first rotary element S4 of the fourth planetary gear set PG4 is selectively connected to the transmission case CS via a second brake B2, which is another one of the gear shift elements. Remaining gear shift elements are configured to form variable connection structures between the rotary elements of the planetary gear sets.

That is, the first brake B1 and the second brake B2 serve respectively to restrict or allow the rotation of the second rotary element C3 of the third planetary gear set PG3 and the first rotary element S4 of the fourth planetary gear set PG4.

A first clutch CL1, which is one of the gear shift elements, connect selectively the second rotary element C1 of the first planetary gear set PG1 and the input shaft IN. A second clutch CL2, which is another one of the gear shift elements, connect selectively the third rotary element R2 of the second planetary gear set PG2 and the input shaft IN. A third clutch CL3, which is another one of the gear shift elements, connect selectively the first rotary element S3 of the third planetary gear set PG3 and the first rotary element S4 of the fourth planetary gear set PG4. A fourth clutch CL4, which is another one of the gear shift elements, connect selectively the first rotary element S3 of the third planetary gear set PG3 and the second rotary element C4 of the fourth planetary gear set PG4.

In this embodiment, the first, second, and third rotary elements of the first planetary gear set PG1 include a first sun gear S1, a first carrier C1, and a first ring gear R1. The first, second, and third rotary elements of the second planetary gear set PG2 include a second sun gear S2, a second carrier C2, and a second ring gear R2. The first, second, and third rotary elements of the third planetary gear set PG3 include a third sun gear S3, a third carrier C3, and a third ring gear R3. The first, second, and third rotary elements of the fourth planetary gear set PG4 include a fourth sun gear S4, a fourth carrier C4, and a fourth ring gear R4.

The multi-stage transmission for vehicles having the above structure may also be configured as follows.

In detail, the multi-stage transmission for vehicles according to the present disclosure includes a first planetary gear set PG1, a second planetary gear set PG2, a third planetary gear set PG3, and a fourth planetary gear set PG4, each of which has three rotary elements. Eight rotary shafts are connected to the rotary elements of the planetary gear sets.

Here, a first rotary shaft A1 is an input shaft IN. A second rotary shaft A2 is directly connected to a first rotary element S1 of the first planetary gear set PG1, to a first rotary element S2 of the second planetary gear set PG2, and to a first rotary element S3 of the third planetary gear set PG3. A third rotary shaft A3 is directly connected to a second rotary element C1 of the first planetary gear set PG1 and to a third rotary element R3 of the third planetary gear set PG3. A fourth rotary shaft A4 is directly connected to a third rotary element R1 of the first planetary gear set PG1, to a second rotary element C2 of the second planetary gear set PG2, and to a third rotary element R4 of the fourth planetary gear set PG4. A fifth rotary shaft A5 is directly connected to a third rotary element R2 of the second planetary gear set PG2. A sixth rotary shaft A6 is directly connected to a second rotary element C3 of the third planetary gear set PG3. A seventh rotary shaft A7 is directly connected to a first rotary element S4 of the fourth planetary gear set PG4. An eighth rotary shaft A8 is an output shaft OUT, which is directly connected to a second rotary element C4 of the fourth planetary gear set PG4.

Of the six gear shift elements, the first clutch CL1 is mounted between the first rotary shaft A1 and the third rotary shaft A3. The second clutch CL2 is mounted between the first rotary shaft A1 and the fifth rotary shaft A5. The third clutch CL3 is mounted between the second rotary shaft A2 and the seventh rotary shaft A7. The fourth clutch CL4 is mounted between the second rotary shaft A2 and the eighth rotary shaft A8. The first brake B1 is mounted between the sixth rotary shaft A6 and the transmission case CS. The second brake B2 is mounted between the seventh rotary shaft A7 and the transmission case CS.

In addition, the present disclosure is characterized in that the multi-stage transmission further includes four clutches that interconnect the rotary shafts in respective pairs and two brakes that selectively connect ones of the rotary shafts to one of the input shaft IN or the output shaft OUT that is not connected to the transmission case CS.

The four clutches include a first clutch CL1 mounted between the first rotary shaft A1 and the third rotary shaft A3, a second clutch CL2 mounted between the first rotary shaft A1 and the fifth rotary shaft A5, a third clutch CL3 mounted between the second rotary shaft A2 and the seventh rotary shaft A7, and a fourth clutch CL4 mounted between the second rotary shaft A2 and the eighth rotary shaft A8.

The two brakes include a first brake B1 mounted between the sixth rotary shaft A6 and the transmission case CS and a second brake B2 mounted between the seventh rotary shaft A7 and the transmission case CS.

In this embodiment, the first, second, and third rotary elements of the first planetary gear set PG1 include a first sun gear S1, a first carrier C1, and a first ring gear R1. The first, second, and third rotary elements of the second planetary gear set PG2 include a second sun gear S2, a second carrier C2, and a second ring gear R2. The first, second, and third rotary elements of the third planetary gear set PG3 include a third sun gear S3, a third carrier C3, and a third ring gear R3. The first, second, and third rotary elements of the fourth planetary gear set PG4 include a fourth sun gear S4, a fourth carrier C4, and a fourth ring gear R4.

The multi-stage transmission, including the four planetary gear sets and the six gear shift elements as described above, may realize 10 forward stages and 1 reverse stage according to the operation mode table shown in FIG. 2. A large number of gear shift stages may be realized through a relatively small number of parts and a simple structure, whereby the fuel economy and quietness of vehicles are improved.

As is apparent from the above description, in the multi-stage transmission for vehicles having the above structure, the speed and direction of the rotary elements of the four planetary gear sets are changed according to selective intermittent operation of the clutches and the brakes, whereby gear shifting is achieved. It is possible to realize 10 forward stages and 1 reverse stage through such gear shifting.

Consequently, it is possible to improve fuel economy by increasing the number of gear shift stages of an automatic transmission and to attenuate traveling noise of the vehicle by using an operation point within a low RPM range of the engine.

Although the embodiments of the present disclosure have been described above with reference to the accompanying drawings, those having ordinary skill in the art will appreciate that the present disclosure can be implemented in various other embodiments without changing the technical ideas or features thereof.

What is claimed is:
1. A multi-stage transmission for vehicles comprising:
an input shaft and an output shaft;
a first planetary gear set, a second planetary gear set, a third planetary gear set, and a fourth planetary gear set configured to transmit rotary force between the input shaft and the output shaft, each of the planetary gear sets has three rotary elements; and
six gear shift elements each connected to at least one of the three rotary elements of the first to fourth planetary gear sets, wherein a first rotary element of the first planetary gear set is fixedly connected to a first rotary element of the second planetary gear set and to a first rotary element of the third planetary gear set, a second rotary element of the first planetary gear set is fixedly connected to a third rotary element of the third planetary gear set, and a third rotary element of the first planetary gear set is fixedly connected to a second rotary element of the second planetary gear set, wherein the second rotary element of the second planetary gear set is fixedly connected to a third rotary element of the fourth planetary gear set, wherein a second rotary element of the third planetary gear set is selectively connected to a transmission case via one of the six gear shift elements, and wherein a first rotary element of the fourth planetary gear set is selectively connected to the transmission case via another one of the six gear shift elements and a second rotary element of the fourth planetary gear set is fixedly connected to the output shaft.

2. The multi-stage transmission according to claim 1, wherein the second rotary element of the first planetary gear set is selectively connected to the input shaft, a third rotary element of the second planetary gear set is selectively connected to the input shaft, and the first rotary element of the third planetary gear set is selectively connected to the first rotary element of the fourth planetary gear set and to the second rotary element of the fourth planetary gear set.

3. The multi-stage transmission according to claim 2, wherein the second rotary element of the third planetary gear set is selectively connected to the transmission case via a first brake, which is one of the six gear shift elements, wherein the first rotary element of the fourth planetary gear set is selectively connected to the transmission case via a second brake, which is another one of the six gear shift elements, and wherein remaining ones of the six gear shift elements are configured to selectively connect the rotary elements of the planetary gear sets.

4. The multi-stage transmission according to claim 3, wherein a first clutch, which is one of the six gear shift elements, connects selectively the second rotary element of the first planetary gear set and the input shaft, wherein a second clutch, which is another one of the six gear shift elements, connects selectively the third rotary element of the second planetary gear set and the input shaft, wherein a third clutch, which is another one of the six gear shift elements, connects selectively the first rotary element of the third planetary gear set and the first rotary element of the fourth planetary gear set, and wherein a fourth clutch, which is another one of the six gear shift elements, connects selectively the first rotary element of the third planetary gear set and the second rotary element of the fourth planetary gear set.

5. The multi-stage transmission according to claim 2, wherein the first, the second, and the third rotary elements of the first planetary gear set comprise a first sun gear, a first carrier, and a first ring gear, wherein the first, the second, and the third rotary elements of the second planetary gear set comprise a second sun gear, a second carrier, and a second ring gear, wherein the first, the second, and the third rotary elements of the third planetary gear set comprise a third sun gear, a third carrier, and a third ring gear, and wherein the first, the second, and the third rotary elements of the fourth planetary gear set comprise a fourth sun gear, a fourth carrier, and a fourth ring gear.

6. A multi-stage transmission for vehicles comprising:
a first planetary gear set, a second planetary gear set, a third planetary gear set, and a fourth planetary gear set, each of which has three rotary elements; and
first to eighth rotary shafts each connected to at least one of the rotary elements of the first to fourth planetary gear sets,
wherein the first rotary shaft is an input shaft,
wherein the second rotary shaft is directly connected to a first rotary element of the first planetary gear set, to a first rotary element of the second planetary gear set, and to a first rotary element of the third planetary gear set,
wherein the third rotary shaft is directly connected to a second rotary element of the first planetary gear set and to a third rotary element of the third planetary gear set,
wherein the fourth rotary shaft is directly connected to a third rotary element of the first planetary gear set, to a second rotary element of the second planetary gear set, and to a third rotary element of the fourth planetary gear set,
wherein the fifth rotary shaft is directly connected to a third rotary element of the second planetary gear set,
wherein the sixth rotary shaft is directly connected to a second rotary element of the third planetary gear set,
wherein the seventh rotary shaft is directly connected to a first rotary element of the fourth planetary gear set, and
wherein the eighth rotary shaft is an output shaft, which is directly connected to a second rotary element of the fourth planetary gear set.

7. The multi-stage transmission according to claim 6, further comprising:
four clutches that each interconnect corresponding rotary shafts of the first to eighth rotary shafts in respective pairs; and
two brakes that each selectively connect a respective one of the rotary shafts to which the input shaft or the output shaft is not connected to a transmission case.

8. The multi-stage transmission according to claim 7, wherein the four clutches comprise a first clutch mounted between the first rotary shaft and the third rotary shaft, a second clutch mounted between the first rotary shaft and the fifth rotary shaft, a third clutch mounted between the second rotary shaft and the seventh rotary shaft, and a fourth clutch mounted between the second rotary shaft and the eighth rotary shaft, and wherein the two brakes comprise a first brake mounted between the sixth rotary shaft and the transmission case and a second brake mounted between the seventh rotary shaft and the transmission case.

9. The multi-stage transmission according to claim 6, wherein the first, the second, and the third rotary elements of the first planetary gear set comprise a first sun gear, a first carrier, and a first ring gear, wherein the first, the second, and the third rotary elements of the second planetary gear set comprise a second sun gear, a second carrier, and a second ring gear, wherein the first, the second, and the third rotary elements of the third planetary gear set comprise a third sun gear, a third carrier, and a third ring gear, and wherein the first, the second, and the third rotary elements of the fourth planetary gear set comprise a fourth sun gear, a fourth carrier, and a fourth ring gear.

* * * * *